US009611776B2

(12) United States Patent
Hagiwara et al.

(10) Patent No.: US 9,611,776 B2
(45) Date of Patent: Apr. 4, 2017

(54) DETERIORATION DIAGNOSIS DEVICE FOR AN EXHAUST GAS PURIFICATION APPARATUS

(71) Applicant: TOYOTA JIDOSHA KABUSHIKI KAISHA, Toyota-shi, Aichi-ken (JP)

(72) Inventors: Koji Hagiwara, Susono (JP); Hirotaka Saitoh, Shizuoka-ken (JP); Toru Kidokoro, Hadano (JP); Yasushi Iwazaki, Ebina (JP); Takahiko Fujiwara, Shizuoka-ken (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/977,916

(22) Filed: Dec. 22, 2015

(65) Prior Publication Data
US 2016/0186638 A1 Jun. 30, 2016

(30) Foreign Application Priority Data

Dec. 26, 2014 (JP) .................................. 2014-265383

(51) Int. Cl.
*F01N 3/00* (2006.01)
*F01N 11/00* (2006.01)
(Continued)

(52) U.S. Cl.
CPC ............ *F01N 11/007* (2013.01); *F01N 3/208* (2013.01); *F02D 41/00* (2013.01); *F01N 2550/02* (2013.01); *F01N 2610/02* (2013.01)

(58) Field of Classification Search
USPC ................. 60/276, 277, 286, 295, 297, 301
See application file for complete search history.

(56) References Cited

U.S. PATENT DOCUMENTS 6,216,448 B1 * 4/2001 Schnaibel ............. F01N 3/0842
60/274
6,463,735 B2 * 10/2002 Morinaga ............. F01N 3/0842
60/276

(Continued)

FOREIGN PATENT DOCUMENTS

JP 2008-128213 A 6/2008
JP 2012-241652 A 12/2012

(Continued)

*Primary Examiner* — Binh Q Tran
(74) *Attorney, Agent, or Firm* — Andrews Kurth Kenyon LLP

(57) ABSTRACT

In an deterioration diagnosis device for the exhaust gas purification apparatus in which in a period of time in which inducement processing is carried out which is to induce a water-gas-shift-reaction in a catalyst disposed at the upstream side of the SCR catalyst, by changing an air fuel ratio of exhaust gas discharged from an internal combustion engine from a lean air fuel ratio into a predetermined rich air fuel ratio, an air fuel ratio of exhaust gas flowing into the SCR catalyst and an air fuel ratio of exhaust gas flowing out from the SCR catalyst are measured by the air fuel ratio sensors, respectively, so that deterioration of the SCR catalyst is diagnosed based on a difference between the measured values of these sensors, wherein an end time of the execution of the inducement processing is adjusted in such a manner that an amount of hydrogen oxidized in the SCR catalyst during the period of the execution of the inducement processing becomes constant.

4 Claims, 6 Drawing Sheets

(51) Int. Cl.
*F01N 3/20* (2006.01)
*F02D 41/00* (2006.01)

(56) References Cited

U.S. PATENT DOCUMENTS

| | | | | |
|---|---|---|---|---|
| 6,696,673 | B2 * | 2/2004 | Okamoto | F02D 41/1494 |
| | | | | 123/697 |
| 6,843,051 | B1 * | 1/2005 | Surnilla | B01D 53/9431 |
| | | | | 60/274 |
| 8,061,126 | B2 * | 11/2011 | Gady | B01D 53/30 |
| | | | | 60/286 |
| 2006/0130457 | A1 * | 6/2006 | Hirowatari | F02D 41/1441 |
| | | | | 60/276 |
| 2007/0234708 | A1 * | 10/2007 | Jones | F01N 11/00 |
| | | | | 60/277 |

FOREIGN PATENT DOCUMENTS

| | | |
|---|---|---|
| JP | 2016-008510 A | 1/2016 |
| WO | 2015/194155 A1 | 12/2015 |

* cited by examiner

DETERIORATION DIAGNOSIS DEVICE FOR AN EXHAUST GAS PURIFICATION APPARATUS

BACKGROUND OF THE INVENTION

Field of the Invention

The present invention relates to a technology for diagnosing deterioration of an exhaust gas purification apparatus disposed in an exhaust passage of an internal combustion engine, and in particular to a technology for diagnosing the deterioration of the exhaust gas purification apparatus provided with a selective catalytic reduction (SCR) catalyst.

Description of the Related Art

As a method of diagnosing deterioration of an exhaust gas purification apparatus disposed in an exhaust passage of an internal combustion engine, there has been known a method of using measured values of air fuel ratio sensors (or oxygen concentration sensors) which are disposed in a portion of the exhaust passage at the upstream side of the exhaust gas purification apparatus and in a portion of the exhaust passage at the downstream side of the exhaust gas purification apparatus, respectively. Specifically, there has been known the technology in which an amount of oxygen ($O_2$) which can be stored by the exhaust gas purification apparatus (hereinafter, referred to as an "oxygen storage capacity") is obtained from a difference between outputs of the above-mentioned sensors disposed at two locations (hereinafter, referred to as a "sensor output difference") at the time of changing the air fuel ratio of the exhaust gas flowing into the exhaust gas purification apparatus from a lean air fuel ratio higher than a stoichiometric air fuel ratio into a rich air fuel ratio lower than the stoichiometric air fuel ratio, and the deterioration of the exhaust gas purification apparatus is diagnosed based on the oxygen storage capacity thus obtained (for example, refer to Japanese patent laid-open publication No. 2012-241652).

In Japanese patent laid-open publication No. 2008-128213, there is disclosed a technology in which in an exhaust gas purification apparatus provided with a three-way catalyst and a lean $NO_X$ catalyst, the amount of a reducing agent supplied to the lean $NO_X$ catalyst is adjusted according to the degree of deterioration of the three-way catalyst.

SUMMARY OF THE INVENTION

Although the above-mentioned conventional technologies are aimed at an exhaust gas purification apparatus equipped with a three-way catalyst, but an SCR catalyst also has an oxygen storage ability, similar to the three-way catalyst, so it can be considered that deterioration of the SCR catalyst is diagnosed by the same method as in the above-mentioned conventional technologies. However, the oxygen storage capacity of the SCR catalyst is smaller than the oxygen storage capacity of the three-way catalyst, and hence, even in cases where the SCR catalyst is in a normal state where it has not deteriorated, a sensor output difference becomes small. For that reason, when an error is included in a measured value of at least one of the sensors for measuring the air fuel ratio of exhaust gas, the oxygen storage capacity of the SCR catalyst can not be obtained in an accurate manner from the sensor output difference, so that diagnostic accuracy may be reduced.

In contrast to this, there can be considered a method in which a three-way catalyst and a storage reduction catalyst (NSR ($NO_X$ Storage Reduction) catalyst) are disposed in an exhaust passage at the upstream side of an SCR catalyst, wherein a difference between a sensor output difference at the time when the SCR catalyst is normal and a sensor output difference at the time when the SCR catalyst has deteriorated is made to enlarge, by causing a water-gas-shift-reaction to occur in the three-way catalyst or the NSR catalyst at the time when the air fuel ratio of exhaust gas is changed from a lean air fuel ratio into a rich air fuel ratio.

However, even though the air fuel ratio of the exhaust gas flowing into the three-way catalyst or the NSR catalyst is controlled to a fixed rich air fuel ratio at the time of causing the water-gas-shift-reaction to occur, the air fuel ratio of the exhaust gas flowing into the SCR catalyst may vary under the influence of the amount of oxygen and the amount of $NO_X$, etc., which desorb from the three-way catalyst or the NSR catalyst. When the air fuel ratio of the exhaust gas flowing into the SCR catalyst varies, the amount of hydrogen ($H_2$) oxidized by the SCR catalyst varies, so that the sensor output difference may also vary accordingly. In such a case, the oxygen storage capacity of the SCR catalyst can not be obtained in an accurate manner, so that it may become impossible to diagnose deterioration of the SCR catalyst in an accurate manner.

The present invention has been made in view of the actual circumstances as referred to above, and the object of the present invention is to provide a technology in which deterioration of an SCR catalyst can be diagnosed with sufficient accuracy by making use of a sensor for measuring an air fuel ratio of exhaust gas flowing into an exhaust gas purification apparatus equipped with the SCR catalyst, and a sensor for measuring an air fuel ratio of exhaust gas flowing out from the exhaust gas purification apparatus.

In order to solve the above-mentioned problems, the present invention resides in a deterioration diagnosis device for an exhaust gas purification apparatus in which at the time when an air fuel ratio of exhaust gas discharged from an internal combustion engine is a lean air fuel ratio, inducement processing is started which is to induce a water-gas-shift-reaction in a catalyst by changing to a predetermined rich air fuel ratio lower than a stoichiometric air fuel ratio an air fuel ratio of exhaust gas flowing into the catalyst disposed at the upstream side of an SCR catalyst, and an air fuel ratio of exhaust gas flowing into the SCR catalyst and an air fuel ratio of exhaust gas flowing out of the SCR catalyst during the period of the execution of the inducement processing are measured by means of air fuel ratio sensors, respectively, so that deterioration of the SCR catalyst is diagnosed based on a difference between the measured values of these sensors, wherein the length of the period of the execution of the inducement processing is adjusted in such a manner that an amount of hydrogen oxidized in the SCR catalyst during the period of the execution of the inducement processing becomes constant.

Specifically, the present invention is constructed to provided with: a first exhaust gas purification device that is arranged in an exhaust passage of an internal combustion engine which can be operated in a lean burn state, and is equipped with a catalyst which serves to promote a water-gas-shift-reaction when an air fuel ratio of exhaust gas is a rich air fuel ratio which is lower than a stoichiometric air fuel ratio; a second exhaust gas purification device that is arranged in the exhaust passage at the downstream side of the first exhaust gas purification device, and is equipped with a selective catalytic reduction catalyst which serves to store oxygen in the exhaust gas when the air fuel ratio of the exhaust gas is a lean air fuel ratio higher than the stoichiometric air fuel ratio, but to desorb the oxygen thus stored when the fuel ratio of the exhaust gas is equal to or lower than the stoichiometric air fuel ratio; a first air fuel ratio sensor that measures a physical quantity correlated with an air fuel ratio of exhaust gas flowing into the second exhaust gas purification device; a second air fuel ratio sensor that measures a physical quantity correlated with an air fuel ratio of exhaust gas flowing out from the second exhaust gas purification device; and, controller comprising at least one processor. And, the controller is configured to start inducement processing, which is to induce a water-gas-shift-reaction in the first exhaust gas purification device by changing an air fuel ratio of exhaust gas flowing into the first exhaust gas purification device to a predetermined rich air fuel ratio lower than the stoichiometric air fuel ratio, when an air fuel ratio of exhaust gas discharged from an internal combustion engine is a lean air fuel ratio, estimate, after the start of the inducement processing, an amount of hydrogen oxidized per unit time in a predetermined state of the selective catalytic reduction catalyst based on a measured value of the first air fuel ratio sensor, integrate an estimated value thus obtained for each unit time, and end the inducement processing when an integrated value thus obtained becomes equal to or more than a predetermined target amount; and obtain a total sensor output difference, which is a total sum of a sensor output difference in a period of time from the start to the end of the inducement processing, by integrating the sensor output difference which is a difference between the measured value of the first air fuel ratio sensor and a measured value of the second air fuel ratio sensor in the period of time, and diagnose deterioration of the second exhaust gas purification device by using the total sensor output difference as a parameter.

When the air fuel ratio of exhaust gas discharged from the internal combustion engine is a lean air fuel ratio, the air fuel ratio of exhaust gas flowing into the first exhaust gas purification device and the air fuel ratio of exhaust gas flowing into the second exhaust gas purification device become lean air fuel ratios, respectively. In that case, the oxygen contained in the exhaust gas is stored by the SCR catalyst of the second exhaust gas purification device. When the air fuel ratio of exhaust gas flowing into the first exhaust gas purification device is changed from a lean air fuel ratio to a predetermined rich air fuel ratio by the inducement processing being carried out in such a state, the air fuel ratio of exhaust gas flowing into the second exhaust gas purification device will also change from a lean air fuel ratio to a predetermined rich air fuel ratio. As a result, the oxygen stored in the SCR catalyst desorbs from the SCR catalyst.

The oxygen desorbed from the SCR catalyst flows out of the second exhaust gas purification device together with the exhaust gas. For that reason, the air fuel ratio of the exhaust gas flowing out of the second exhaust gas purification device becomes higher than the air fuel ratio of the exhaust gas flowing into the second exhaust gas purification device. As a result, there occurs a difference between the measured value of the first air fuel ratio sensor and the measured value of the second air fuel ratio sensor, resulting from the amount of the oxygen desorbed from the SCR catalyst of the second exhaust gas purification device.

In addition, when the air fuel ratio of the exhaust gas flowing into the first exhaust gas purification device has been made to be the predetermined rich air fuel ratio by means of the execution of the inducement processing, a water-gas-shift-reaction occurs in the catalyst of the first exhaust gas purification device. For that reason, in the catalyst of the first exhaust gas purification device, carbon monoxide (CO) and water ($H_2O$) in the exhaust gas react with each other to produce carbon dioxide ($CO_2$) and hydrogen. The hydrogen produced in the first exhaust gas purification device arrives at the first air fuel ratio sensor together with the exhaust gas. At that time, because the diffusion rate of the hydrogen is faster than that of any of the other exhaust gas components, the hydrogen precedently arrives at a sensor element of the first air fuel ratio sensor, thus putting the surrounding atmosphere of the sensor element into a rich atmosphere. As a result, the measured value of the first air fuel ratio sensor becomes lower than an actual air fuel ratio (rich shift). After that, when the hydrogen produced in the first exhaust gas purification device flows into the second exhaust gas purification device, it will be oxidized by the SCR catalyst of the second exhaust gas purification device, so that the rich shift of the second air fuel ratio sensor becomes smaller than that of the first air fuel ratio sensor. As a result, there also occurs a difference between the measured value of the first air fuel ratio sensor and the measured value of the second air fuel ratio sensor, resulting from the amount of the hydrogen oxidized by the SCR catalyst of the second exhaust gas purification device.

Accordingly, a difference resulting from the amount of the oxygen desorbed from the SCR catalyst of the second exhaust gas purification device, and a difference resulting from the amount of the hydrogen oxidized in the second exhaust gas purification device are included in the difference between the measured value of the first air fuel ratio sensor and the measured value of the second air fuel ratio sensor in the state where the inducement processing has been carried out.

Here, as the SCR catalyst deteriorates, the oxygen storage ability of the SCR catalyst also deteriorates accordingly, so that the oxygen storage capacity of the SCR catalyst becomes smaller. Accordingly, in the case where the SCR catalyst of the second exhaust gas purification device has deteriorated, the amount of oxygen to desorb from the SCR catalyst of the second exhaust gas purification device at the time of the execution of the inducement processing becomes smaller, in comparison with the case where the SCR catalyst has not deteriorated. As a result, the measured value of the second air fuel ratio sensor becomes closer to the measured value of the first air fuel ratio sensor.

Moreover, in the case where the SCR catalyst has deteriorated, the amount of the hydrogen oxidized by the SCR catalyst becomes smaller, in comparison with the case where the SCR catalyst has not deteriorated. For that reason, in cases where the SCR catalyst of the second exhaust gas purification device has deteriorated, the amount of the hydrogen arriving at the second air fuel ratio sensor at the time of the execution of the inducement processing becomes larger, in comparison with the case where the SCR catalyst has not deteriorated, so that the rich shift of the second air fuel ratio sensor accordingly becomes larger. As a result, the measured value of the second air fuel ratio sensor becomes closer to the measured value of the first air fuel ratio sensor.

Accordingly, in the case where the SCR catalyst of the second exhaust gas purification device has not deteriorated, the difference between the measured value of the first air fuel ratio sensor and the measured value of the second air fuel ratio sensor becomes large due to the synergetic effect of the oxygen storage ability and the hydrogen oxidation ability of the SCR catalyst, but in contrast to this, in the case where the SCR catalyst of the second exhaust gas purification device has deteriorated, the difference between the measured value of the first air fuel ratio sensor and the measured value of the second air fuel ratio sensor becomes small due to the synergetic effect of a decrease in the oxygen storage ability and a decrease in the hydrogen oxidation ability of the SCR catalyst. For that reason, an integrated value of the difference between the measured value of the first air fuel ratio sensor and the measured value of the second air fuel ratio sensor (a total sensor output difference) in a period of time from the start to the end of the inducement processing will differ greatly between the case where the SCR catalyst of the second exhaust gas purification device has not deteriorated and the case where the SCR catalyst has deteriorated.

When a remarkable difference occurs in the total sensor output difference between the case where the SCR catalyst has not deteriorated and the case where the SCR catalyst has deteriorated, even in cases where an error is included in the measured value of the first air fuel ratio sensor and/or the measured value of the second air fuel ratio sensor, the influence of the error becomes small, and hence, it becomes possible to carry out deterioration diagnosis of the SCR catalyst of the second exhaust gas purification device with sufficient accuracy. In addition, because existing sensors such as air fuel ratio sensors, oxygen concentration sensors, or the like can be used as the first air fuel ratio sensor and the second air fuel ratio sensor, the cost for the deterioration diagnosis device can also be decreased, in comparison with the case where $NO_X$ sensors, $NH_3$ sensors, etc., are used.

However, the air fuel ratio of the exhaust gas flowing into the second exhaust gas purification device at the time of the execution of the inducement processing may vary each time the inducement processing is carried out. For example, at the beginning of the start of the inducement processing, oxygen, $NO_X$ and so on also desorb from the catalyst of the first exhaust gas purification device, too, so that the air fuel ratio of the exhaust gas flowing into the second exhaust gas purification device may become higher than the predetermined rich air fuel ratio. At that time, the amount of oxygen and the amount of $NO_X$ to desorb from the catalyst of the first exhaust gas purification device may vary each time the inducement processing is carried out. For that reason, there is a high possibility that the air fuel ratio of the exhaust gas flowing into the second exhaust gas purification device at the beginning of the start of the inducement processing differs each time the inducement processing is carried out. When the air fuel ratio of the exhaust gas flowing into the second exhaust gas purification device varies in this manner, the total amount of hydrogen oxidized in the SCR catalyst during the execution of the inducement processing (hereinafter, referred to as a "total amount of oxidation") also varies, so that a variation in the total sensor output difference may also occur accordingly. When the variation in the total sensor output difference resulting from the variation in the air fuel ratio of the exhaust gas as referred to above occurs, it may become difficult to diagnose the deterioration state of the SCR catalyst in an accurate manner.

On the other hand, the controller of the present invention estimates an amount of hydrogen oxidized per unit time in a predetermined state of the SCR catalyst (hereinafter, referred to in a "reference amount of oxidation") based on the measured value of the first air fuel ratio sensor, during the execution of the inducement processing. Then, the controller of the present invention integrates the reference amount of oxidation for each unit time, and ends the execution of the inducement processing when an integrated value thus obtained (hereinafter, referred to as a reference total amount of oxidation) becomes equal to or more than a predetermined target amount. Thus, when the end time of the inducement processing is controlled, even if the air fuel ratio of the exhaust gas flowing into the second exhaust gas purification device varies at the time of the execution of the inducement processing, the variation in the total amount of oxidation is suppressed, so that the variation in the total sensor output difference is also suppressed accordingly. As a result, it becomes possible to diagnose the deterioration state of the SCR catalyst in a more accurate manner. Here, note that the "predetermined state" referred to herein may be a normal state where the SCR catalyst has not deteriorated, or may be a state where the SCR catalyst has deteriorated. However, when the predetermined state is assumed to be the state where the SCR catalyst has deteriorated, the reference amount of oxidation will become small, so that a period of time from the start of the inducement processing until the total reference amount of oxidation becomes equal to or more than the target amount may become long. Accordingly, it can be the that it is desirable that the predetermined state be the normal state where the SCR catalyst has not deteriorated.

Here, the SCR catalyst of the second exhaust gas purification device has a characteristic in which an amount of hydrogen which can be oxidized per unit time becomes smaller in the case where the air fuel ratio of the exhaust gas flowing into the SCR catalyst is high, in comparison with the case where it is low. For that reason, the controller may estimate the reference amount of oxidation to be smaller in the case where the measured value of the first air fuel ratio sensor is high, in comparison with the case where it is low.

According to the present invention, deterioration of an SCR catalyst can be diagnosed with sufficient accuracy, by making use of a sensor for measuring an air fuel ratio of exhaust gas flowing into an exhaust gas purification apparatus, which is equipped with the SCR catalyst, and a sensor for measuring an air fuel ratio of exhaust gas flowing out of the exhaust gas purification apparatus.

Further features of the present invention will become apparent from the following description of exemplary embodiments with reference to the attached drawings.

DESCRIPTION OF THE EMBODIMENTS

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Figure 1:
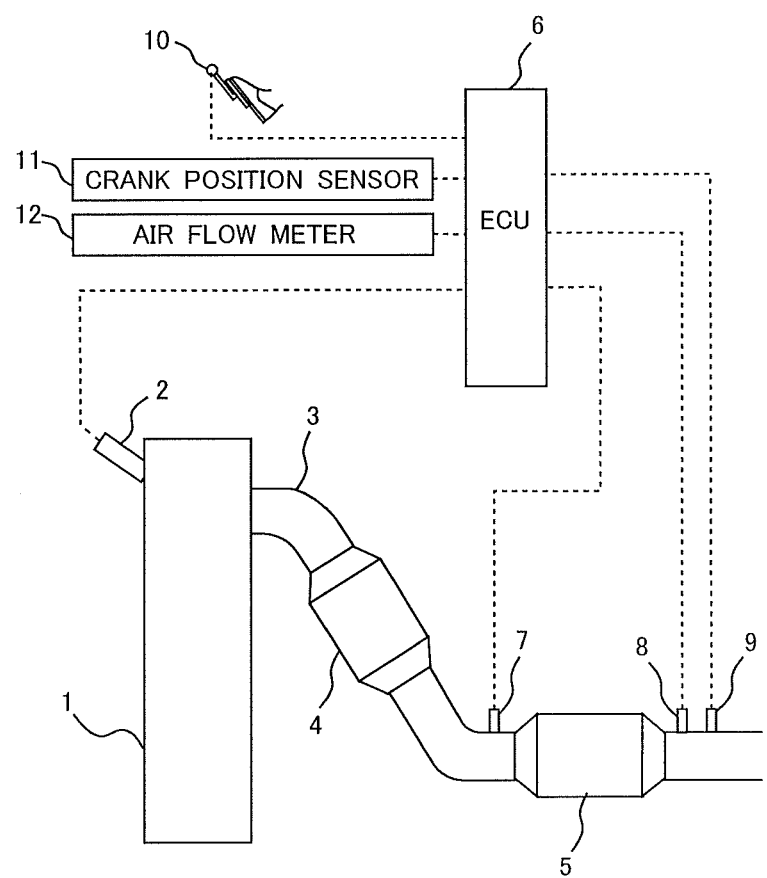
FIG. 1 is a view showing the schematic construction of an exhaust system of an internal combustion engine, to which the present invention is applied.

FIG. 1 is a view showing the schematic construction of an exhaust system of an internal combustion engine, to which the present invention is applied. The internal combustion engine 1 shown in FIG. 1 is a spark ignition type internal combustion engine (gasoline engine) which is able to be operated (in lean burn operation) by combusting a mixture having a lean air fuel ratio higher than a stoichiometric air fuel ratio, but may instead be a compression ignition type internal combustion engine.

The internal combustion engine 1 is provided with fuel injection valves 2 for supplying fuel to individual cylinders, respectively. Each of the fuel injection valves 2 may be a valve mechanism which serves to inject fuel into an intake port of each corresponding cylinder, or may be a valve mechanism which serves to inject fuel into each corresponding cylinder.

An exhaust pipe 3 is connected to the internal combustion engine 1. The exhaust pipe 3 is a pipe having a passage through which a gas (exhaust gas) combusted or burned in the interior of each cylinder of the internal combustion engine 1 flows. A first catalyst casing 4 is arranged in the middle of the exhaust pipe 3. The first catalyst casing 4 receives an occlusion or storage reduction catalyst (hereinafter, referred to as an NSR catalyst) with an $NO_X$ occlusion or storage material attached thereto. Specifically, the first catalyst casing 4 receives a honeycomb structured body covered with a coat layer such as alumina, a precious metal (platinum (Pt), palladium (Pd), etc.) supported by the coat layer, a promoter or co-catalyst such as ceria ($CeO_2$) supported by the coat layer, and an $NO_X$ occlusion or storage material (alkalines, alkaline earths, etc.) supported by the coat layer. The first catalyst casing 4 corresponds to a "first exhaust gas purification device" according to the present invention.

A second catalyst casing 5 is arranged in the exhaust pipe 3 at the downstream side of the first catalyst casing 4. The second catalyst casing 5 receives an SCR catalyst. Specifically, the second catalyst casing 5 receives a honeycomb structured body made of cordierite or Fe—Cr—Al based heat resisting steel, a zeolite based coat layer covering the honeycomb structured body, and a transition metal (copper (Cu), iron (Fe), etc.) supported by the coat layer. The second catalyst casing 5 corresponds to a "second exhaust gas purification device" according to the present invention.

In the internal combustion engine 1 constructed in this manner, there is arranged in combination therewith an ECU (Electronic Control Unit) 6 for controlling the internal combustion engine 1. The ECU 6 is an electronic control unit which is composed of a CPU, a ROM, a RAM, a backup RAM, and so on. The ECU 6 is electrically connected to a variety of kinds of sensors such as a first air fuel ratio sensor 7, a second air fuel ratio sensor 8, an exhaust gas temperature sensor 9, an accelerator position sensor 10, a crank position sensor 11, an air flow meter 12, and so on.

The first air fuel ratio sensor 7 is mounted on the exhaust pipe 3 at a location between the first catalyst casing 4 and the second catalyst casing 5, and outputs an electric signal correlated with an air fuel ratio of the exhaust gas which flows into the second catalyst casing 5. This first air fuel ratio sensor 7 corresponds to a "first air fuel ratio sensor" according to the present invention. Here, note that the air fuel ratio of the exhaust gas flowing into the second catalyst casing 5 may be estimated from a measured value of an oxygen concentration sensor that is mounted instead of the first air fuel ratio sensor 7.

The second air fuel ratio sensor 8 is mounted on the exhaust pipe 3 at a location downstream of the second catalyst casing 5, and outputs an electric signal correlated with an air fuel ratio of the exhaust gas which flows out from the second catalyst casing 5. This second air fuel ratio sensor 8 corresponds to a "second air fuel ratio sensor" according to the present invention. Here, note that the air fuel ratio of the exhaust gas flowing out from the second catalyst casing 5 may be estimated from a measured value of an oxygen concentration sensor that is mounted instead of the second air fuel ratio sensor 8.

The exhaust gas temperature sensor 9 is mounted on the exhaust pipe 3 at a location downstream of the second catalyst casing 5, and outputs an electrical signal correlated with a temperature of the exhaust gas flowing in the interior of the exhaust pipe 3. The accelerator position sensor 10 is mounted on an accelerator pedal, and outputs an electric signal correlated with an amount of operation of the accelerator pedal (i.e., a degree of accelerator opening). The crank position sensor 11 is mounted on the internal combustion engine 1, and outputs an electric signal correlated with a rotational position of an engine output shaft (crankshaft). The air flow meter 12 is mounted on an intake pipe (not shown) of the internal combustion engine 1, and outputs an electrical signal correlated with an amount (mass) of fresh air (i.e., air) flowing in the intake pipe.

The ECU 6 controls the operating state of the internal combustion engine 1 based on the output signals of the above-mentioned variety of kinds of sensors. For example, the ECU 6 calculates a target air fuel ratio of the mixture based on an engine load calculated from the output signal of the accelerator position sensor 10 (the accelerator opening degree) and an engine rotational speed calculated from the output signal of the crank position sensor 11. The ECU 6 calculates a target amount of fuel injection (a fuel injection period) based on the target air fuel ratio and the output signal of the air flow meter 12 (the amount of intake air), and operates the fuel injection valves 2 according to the target amount of fuel injection thus calculated. At that time, the ECU 6 sets the target air fuel ratio to a lean air fuel ratio which is higher than the stoichiometric air fuel ratio, in cases where the operating state of the internal combustion engine 1 is in a low rotation and low load region or in a middle rotation and middle load region. In addition, the ECU 6 sets the target air fuel ratio to the stoichiometric air fuel ratio or a rich air fuel ratio which is lower than the stoichiometric air fuel ratio, in cases where the operating state of the internal combustion engine 1 is in a high load region or a high rotation region. Thus, when the operating state of the internal combustion engine 1 belongs to the low rotation and low load region or the middle rotation and middle load region (hereinafter, these operating regions being referred to as a "lean operating region"), the target air fuel ratio is set to a lean air fuel ratio, so that the internal combustion engine 1 is operated in a lean burn state, thereby making it possible to suppress the amount of fuel consumption to a low level.

In addition, the ECU 6 carries out rich spike processing in an appropriate manner, when the operating state of the internal combustion engine 1 is in the above-mentioned lean operating region. The rich spike processing is to adjust the amount of fuel injection and the amount of intake air in such a manner that the concentration of oxygen in the exhaust gas becomes low and the concentration of hydrocarbon or carbon monoxide becomes high. The NSR catalyst received in the first catalyst casing 4 stores or adsorbs $NO_X$ in the exhaust gas, when the oxygen concentration of the exhaust gas flowing into the first catalyst casing 4 is high (i.e., when the air fuel ratio of the exhaust gas is a lean air fuel ratio), and releases the $NO_X$ stored in the NSR catalyst so as to reduce the $NO_X$ thus released to nitrogen ($N_2$) or ammonia ($NH_3$), when the oxygen concentration of the exhaust gas flowing into the first catalyst casing 4 is low, and when reducing components such as hydrocarbon (HC), carbon monoxide (CO), etc., are contained in the exhaust gas (i.e., when the air fuel ratio of the exhaust gas is a rich air fuel ratio). As a result, when rich spike processing is carried out, the $NO_X$ storage capacity of the NSR catalyst will be regenerated.

Accordingly, the ECU 6 suppresses the $NO_X$ storage ability of the NSR catalyst from being saturated, by carrying out the rich spike processing, when the amount of $NO_X$ stored in the NSR catalyst becomes equal to or larger than a fixed amount, or when the operation time of the internal combustion engine 1 from the end time of the last rich spike processing (preferably, the operation time in which the target air fuel ratio has been set to the lean air fuel ratio) becomes equal to or more than a fixed period of time, or when the travel distance of a vehicle, on which the internal combustion engine 1 is mounted, from the end time of the last rich spike processing (preferably, the travel distance within which the target air fuel ratio has been set to the lean air fuel ratio) becomes equal to or more than a fixed distance.

Here, note that as a specific method of carrying out the rich spike processing, there can be used a method of decreasing the air fuel ratio of a mixture to be supplied for combustion in the internal combustion engine 1, by carrying out at least one of processing to increase the target amount of fuel injection for the fuel injection valves 2, and processing to decrease the opening degree of an intake air throttle valve (throttle valve). In addition, in a construction in which a fuel injection valve 2 injects fuel directly into a cylinder, the rich spike processing may be carried out by a method of injecting fuel from the fuel injection valve 2 in the exhaust stroke of the cylinder.

Then, the SCR catalyst of the second catalyst casing 5 serves to adsorb ammonia contained in the exhaust gas, and to reduce $NO_X$ contained in the exhaust gas by means of the ammonia thus adsorbed. The ammonia to be supplied to the SCR catalyst of the second catalyst casing 5 is produced in the NSR catalyst. For example, in cases where the rich spike processing is carried out, a part of the $NO_X$ desorbed from the NSR catalyst of the first catalyst casing 4 reacts with hydrocarbon or hydrogen in the exhaust gas so as to be reduced to ammonia. At that time, the amount of ammonia produced in the NSR catalyst changes according to the interval in which the rich spike processing is carried out, the air fuel ratio of the exhaust gas at the time when the rich spike processing is carried out, etc. Accordingly, when it is necessary to supply ammonia to the SCR catalyst, the ECU 6 may set the interval of execution of the rich spike processing to an interval suitable for production of ammonia, or may set the air fuel ratio of the exhaust gas at the time of the execution of the rich spike processing to an air fuel ratio (e.g., 14.1 or thereabout) suitable for production of ammonia.

When the rich spike processing is carried out according to a variety of purposes as referred to above, the $NO_X$ in the exhaust gas can be reduced or removed, even in cases where the lean burn operation of the internal combustion engine 1 is carried out. However, when the SCR catalyst received in the second catalyst casing 5 deteriorates, the $NO_X$ having not been fully reduced in the first catalyst casing 4 may be discharged into the atmosphere, without being reduced in the second catalyst casing 5, too. For that reason, in cases where the SCR catalyst has deteriorated, it is necessary to detect the deterioration of the SCR catalyst in a quick manner, so that the driver of a vehicle with the internal combustion engine 1 mounted thereon can be prompted to repair the SCR catalyst, or the lean burn operation of the internal combustion engine 1 can be inhibited.

Figure 2:
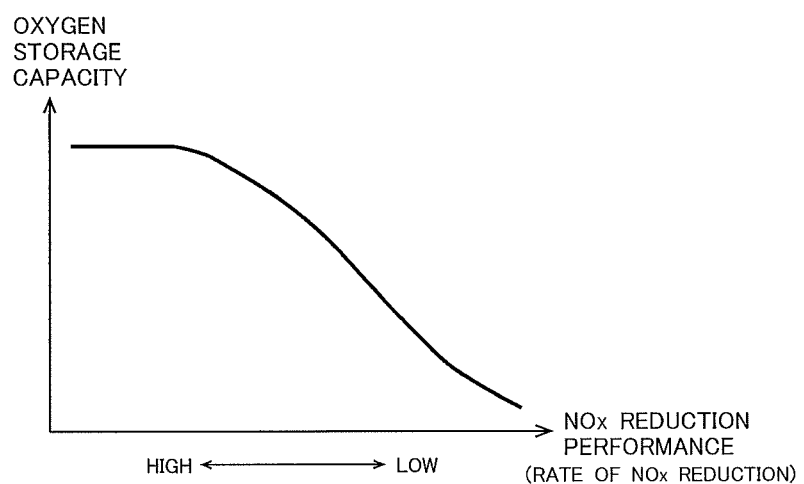
FIG. 2 is a view showing the correlation between $NO_X$ reduction performance and a storage amount of oxygen in an SCR catalyst.

Hereinafter, reference will be made to a method of diagnosing deterioration of the SCR catalyst received in the second catalyst casing 5. In this embodiment, the deterioration of the SCR catalyst is diagnosed based on the oxygen storage ability of the SCR catalyst. The SCR catalyst stores the oxygen in the exhaust gas under the action of the transition metal which is equipped by the SCR catalyst, when the air fuel ratio of the exhaust gas is a lean air fuel ratio. Then, the oxygen stored in the SCR catalyst desorbs from the SCR catalyst, when the air fuel ratio of the exhaust gas changes from the lean air fuel ratio to a rich air fuel ratio. Such oxygen storage ability of the SCR catalyst is correlated with the NOX reduction performance of the SCR catalyst. FIG. 2 is a view showing the correlation between the $NO_X$ reduction performance of the SCR catalyst and the amount of oxygen able to be stored by the SCR catalyst (the oxygen storage capacity). As shown in FIG. 2, when the $NO_X$ reduction performance (the rate of $NO_X$ reduction) of the SCR catalyst is sufficiently high (e.g., when the rate of $NO_X$ reduction is 80%-100%), the oxygen storage capacity of the SCR catalyst also becomes sufficiently large, but when the $NO_X$ reduction performance of the SCR catalyst drops to some extent (e.g., the rate of $NO_X$ reduction drops to less than 80%), the oxygen storage capacity of the SCR catalyst also becomes accordingly small. As a result, by obtaining the oxygen storage capacity of the SCR catalyst, it can be determined whether the $NO_X$ reduction performance of the SCR catalyst has deteriorated. For example, when the oxygen storage capacity of the SCR catalyst is smaller than a predetermined threshold value, a determination can be made that the $NO_X$ reduction performance of the SCR catalyst has deteriorated.

The oxygen storage capacity of the SCR catalyst is correlated with the amount of oxygen which desorbs from the SCR catalyst in the case where the air fuel ratio of the exhaust gas has been changed from a lean air fuel ratio to a rich air fuel ratio. The amount of oxygen to desorb from the SCR catalyst in the case where the air fuel ratio of the exhaust gas has been changed from a lean air fuel ratio to a rich air fuel ratio can be obtained based on a difference between an air fuel ratio (or oxygen concentration) of the exhaust gas flowing into the SCR catalyst and an air fuel ratio (or oxygen concentration) of the exhaust gas flowing out from the SCR catalyst.

For example, in a state where the air fuel ratio of the exhaust gas has been changed from a lean air fuel ratio to a rich air fuel ratio, a difference between the measured value of the first air fuel ratio sensor 7 and the measured value of the second air fuel ratio sensor 8 is obtained, and by substituting the difference thus obtained into the following expression (1), an amount of oxygen Aox desorbed from the SCR catalyst can be obtained at each time point.

$$Aox = \Delta A/F * \alpha * Qinj \tag{1}$$

In the above-mentioned expression (1), $\Delta$ A/F is a value which is obtained by subtracting the measured value of the first air fuel ratio sensor 7 from the measured value of the second air fuel ratio sensor 8; $\alpha$ is a mass ratio of the oxygen contained in the air; and Qinj is an amount of fuel injection.

Subsequently, a total amount of the oxygen desorbed from the SCR catalyst (oxygen storage capacity) can be obtained by carrying out the calculation processing using the above-mentioned expression (1) in a repeated manner and integrating the results of the calculations, in a period of time in which the air fuel ratio of the exhaust gas is maintained at a rich air fuel ratio. When deterioration diagnosis of the SCR catalyst is carried out based on the oxygen storage capacity obtained by such a method, it becomes possible to make the deterioration diagnosis of the SCR catalyst by using existing oxygen concentration sensors and existing air fuel ratio sensors.

However, the oxygen storage capacity of the normal SCR catalyst (the SCR catalyst in its undeteriorated state) is small in comparison with that of the three-way catalyst, the NSR catalyst, or the like, which includes an oxygen occlusion or storage material such as ceria. For that reason, when an error is included in the measured value of the first air fuel ratio sensor 7 or the second air fuel ratio sensor 8, the calculated value of the oxygen storage capacity may become smaller than the threshold value in spite of the fact that the SCR catalyst is normal, or the calculated value of the oxygen storage capacity may become equal to or more than the threshold value in spite of the fact that the SCR catalyst has deteriorated.

Accordingly, in this embodiment, at the time of obtaining the oxygen storage capacity of the SCR catalyst, processing is carried out in which a water-gas-shift-reaction is induced in the NSR catalyst of the first catalyst casing 4 (inducement processing). The inducement processing referred to herein is processing in which when the operating state of the internal combustion engine 1 is in the lean operating region, the air fuel ratio of the exhaust gas flowing into the first catalyst casing 4 is made to be a rich air fuel ratio suitable for the water-gas-shift-reaction, and is processing in which the air fuel ratio of the mixture to be supplied for combustion in the internal combustion engine 1 and the air fuel ratio of the exhaust gas to be discharged from the internal combustion engine 1 are each made to be a rich air fuel ratio, by carrying out at least one of an increase in the amount of fuel injection and a decrease in the amount of intake air, similar to the above-mentioned rich spike processing.

When the air fuel ratio of the exhaust gas flowing into the first catalyst casing 4 is changed from a lean air fuel ratio into a rich air fuel ratio by the execution of the inducement processing, the water-gas-shift-reaction will be promoted by the NSR catalyst of the first catalyst casing 4. In other words, the reaction of water and carbon monoxide in the exhaust gas is promoted by the NSR catalyst of the first catalyst casing 4, so that hydrogen and carbon dioxide are produced.

The hydrogen produced by the water-gas-shift-reaction arrives at the first air fuel ratio sensor 7, together with the exhaust gas. At that time, because the diffusion rate of the hydrogen is faster than that of any of the other exhaust gas components, most of the surface of a sensor element of the first air fuel ratio sensor 7 is covered with the hydrogen to become a rich atmosphere. As a result, a rich shift occurs in which the measured value of the first air fuel ratio sensor 7 becomes lower than an actual air fuel ratio of the exhaust gas. On the other hand, when the hydrogen having passed through the first air fuel ratio sensor 7 flows into the second catalyst casing 5, the hydroxide ions (OH) combined with the transition metal of the SCR catalyst react with the hydrogen in the exhaust gas thereby to produce water. In other words, the hydrogen produced in the first catalyst casing 4 is oxidized and consumed in the second catalyst casing 5. As a result, the rich shift of the second air fuel ratio sensor 8 becomes smaller than the rich shift of the first air fuel ratio sensor 7.

Accordingly, in cases where the above-mentioned inducement processing has been carried out, there will also occur a difference between the measured value of the first air fuel ratio sensor 7 and the measured value of the second air fuel ratio sensor 8 resulting from the amount of hydrogen which is oxidized by the SCR catalyst of the catalyst casing 5, in addition to a difference therebetween resulting from the amount of oxygen to desorb from the SCR catalyst of the catalyst casing 5.

Figure 3:
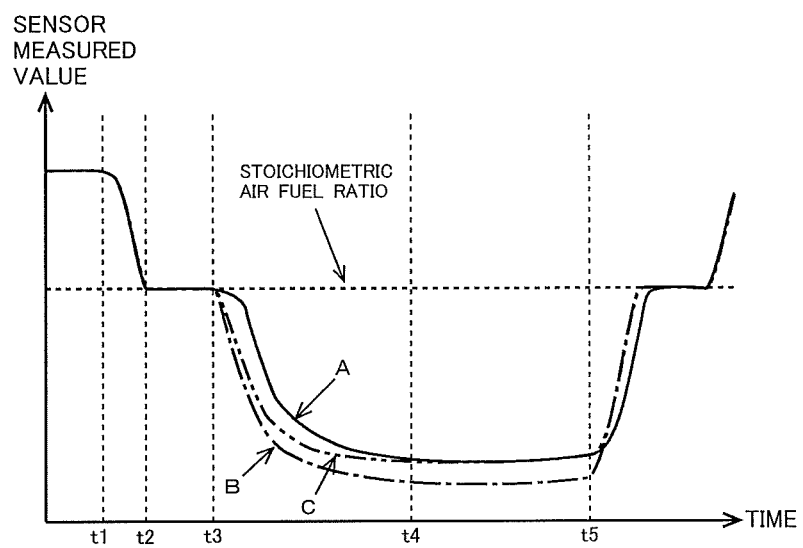
FIG. 3 is a view showing the changes over time of a measured value of a first air fuel ratio sensor and a measured value of a second air fuel ratio sensor in the case of changing the air fuel ratio of exhaust gas from a lean air fuel ratio into a rich air fuel ratio.

Here, in FIG. 3, there are shown the changes over time of the measured value of the first air fuel ratio sensor 7 and the measured value of the second air fuel ratio sensor 8 in the case of changing the air fuel ratio of the exhaust gas to be discharged from the internal combustion engine 1 from a lean air fuel ratio to a rich air fuel ratio, in a normal state where the SCR catalyst of the catalyst casing 5 has not deteriorated. A solid line A in FIG. 3 represents the measured value of the second air fuel ratio sensor 8 (the air fuel ratio of the exhaust gas flowing out from the second catalyst casing 5). An alternate long and short dash line B in FIG. 3 represents the measured value of the first air fuel ratio sensor 7 (i.e., the air fuel ratio of the exhaust gas flowing into the second catalyst casing 5) in the case where a water-gas-shift-reaction has occurred in the first catalyst casing 4 (i.e., in the case where hydrogen is produced in the first catalyst casing 4). An alternate long and two short dashes line C in FIG. 3 represents the measured value of the first air fuel ratio sensor 7 (i.e., the air fuel ratio of the exhaust gas flowing into the second catalyst casing 5) in the case where any water-gas-shift-reaction has not occurred in the first catalyst casing 4 (i.e., in the case where hydrogen is not produced in the first catalyst casing 4).

In FIG. 3, when the air fuel ratio of the exhaust gas to be discharged from the internal combustion engine 1 changes from a lean air fuel ratio to a rich air fuel ratio (at t1 in FIG. 3), the measured value of the first air fuel ratio sensor 7 and the measured value of the second air fuel ratio sensor 8 begin to drop. Then, when the air fuel ratio of the exhaust gas flowing into the first catalyst casing 4 drops to equal to or less than the stoichiometric air fuel ratio, the measured values of the first air fuel ratio sensor 7 and the second air fuel ratio sensor 8 will be held in the vicinity of the stoichiometric air fuel ratio (at t2-t3 in FIG. 3) by means of the oxygen storage ability of the NSR catalyst with which the first catalyst casing 4 is equipped. When all the oxygen stored in the NSR catalyst of the first catalyst casing 4 has been desorbed, the measured values of the first air fuel ratio sensor 7 and the second air fuel ratio sensor 8 begin to drop to a rich air fuel ratio which is lower than the stoichiometric air fuel ratio (at t3 in FIG. 3). At that time, oxygen desorbs from the SCR catalyst of the second catalyst casing 5, so that the measured value of the second air fuel ratio sensor 8 becomes higher than the measured value of the first air fuel ratio sensor 7.

Here, if any water-gas-shift-reaction has not occurred in the first catalyst casing 4, any rich shift does not occur in the first air fuel ratio sensor 7, and so, when all the oxygen stored in the SCR catalyst of the second catalyst casing 5 has been desorbed, the measured value of the second air fuel ratio sensor 8 (the solid line A in FIG. 3) and the measured value of the first air fuel ratio sensor 7 (the alternate long and two short dashes line C in FIG. 3) become substantially the same value (at t4 in FIG. 3).

On the other hand, in cases where a water-gas-shift-reaction has occurred in the first catalyst casing 4, the hydrogen produced in the NSR catalyst generates a rich shift of the first air fuel ratio sensor 7, but the hydrogen is oxidized by the SCR catalyst of the second catalyst casing 5, so a rich shift of the second air fuel ratio sensor 8 does not substantially occur. As a result, even after all the oxygen stored in the SCR catalyst of the second catalyst casing 5 has been desorbed, there occurs a sufficient difference between the measured value of the second air fuel ratio sensor 8 (the solid line A in FIG. 3) and the measured value of the first air fuel ratio sensor 7 (the alternate long and short dash line B in FIG. 3). This difference continuously occurs until an end time point of the inducement processing (i.e., at t5 in FIG. 3).

In this manner, in cases where the water-gas-shift-reaction has been induced in the first catalyst casing 4, there occurs not only the difference between the measured value of the first air fuel ratio sensor 7 and the measured value of the second air fuel ratio sensor 8 resulting from the amount of oxygen to desorb from the SCR catalyst of the second catalyst casing 5, but also the difference therebetween resulting from the amount of hydrogen which is oxidized by the SCR catalyst of the second catalyst casing 5. As a result, in the case where the water-gas-shift-reaction has been induced in the first catalyst casing 4, an integrated value of the difference (a total sensor output difference) between the measured value of the second air fuel ratio sensor 8 (the solid line A in FIG. 3) and the measured value of the first air fuel ratio sensor 7 (the alternate long and short dash line B in FIG. 3) in an execution period of time of the inducement processing (t1-t5 in FIG. 3) becomes larger, in comparison with the case where the water-gas-shift-reaction has not been induced.

On the other hand, when the SCR catalyst in the second catalyst casing 5 deteriorates, both of the oxygen storage ability and the hydrogen oxidation ability of the SCR catalyst drop or decrease. For that reason, in the case where the SCR catalyst of the second catalyst casing 5 has deteriorated, the oxygen storage capacity of the SCR catalyst decreases, and at the same time, the amount of hydrogen oxidized by the SCR catalyst also decreases, in comparison with the case where the SCR catalyst of the second catalyst casing 5 has not deteriorated. As the oxygen storage capacity of the SCR catalyst decreases, the amount of oxygen to desorb from the SCR catalyst at the time of the execution of the inducement processing becomes smaller. As a result, the difference between the measured value of the first air fuel ratio sensor 7 and the measured value of the second air fuel ratio sensor 8 becomes smaller. In addition, as the amount of hydrogen oxidized by the SCR catalyst becomes smaller, the amount of hydrogen arriving at the second air fuel ratio sensor 8 without being oxidized by the SCR catalyst of the second catalyst casing 5 at the time of the execution of the inducement processing increases, and the rich shift of the second air fuel ratio sensor 8 becomes accordingly larger. As a result, the difference between the measured value of the first air fuel ratio sensor 7 and the measured value of the second air fuel ratio sensor 8 becomes smaller.

Accordingly, in the case where the SCR catalyst of the second catalyst casing 5 has not deteriorated, the total sensor output difference becomes large due to the synergetic effect of the oxygen storage ability and the hydrogen oxidation ability of the SCR catalyst, but in contrast to this, in the case where the SCR catalyst of the second catalyst casing 5 has deteriorated, the total sensor output difference becomes small due to the synergetic effect of a decrease in the oxygen storage ability and a decrease in the hydrogen oxidation ability of the SCR catalyst. As a result, a remarkable difference occurs in the total sensor output difference between the case where the SCR catalyst of the second catalyst casing 5 has not deteriorated and the case where the SCR catalyst has deteriorated.

When a remarkable difference occurs in the total sensor output difference between the case where the SCR catalyst of the second catalyst casing 5 has not deteriorated and the case where the SCR catalyst has deteriorated, even in cases where an error is included in the measured value of the first air fuel ratio sensor 7 and/or the measured value of the second air fuel ratio sensor 8, the influence of the error becomes small, and hence, it becomes possible to diagnose the deterioration state of the SCR catalyst of the second catalyst casing 5 with sufficient accuracy.

Here, note that the amount of hydrogen produced by the NSR catalyst of the first catalyst casing 4 at the time of the execution of the inducement processing changes according to the air fuel ratio of the exhaust gas flowing into the first catalyst casing 4. For example, in the case where the air fuel ratio of the exhaust gas flowing into the first catalyst casing 4 is low, the amount of hydrogen produced by the NSR catalyst becomes larger, in comparison with the case where it is high. Accordingly, in order to produce a sufficient amount of hydrogen in the NSR catalyst of the first catalyst casing 4, it is desirable to make as low as possible the air fuel ratio of the exhaust gas flowing into the first catalyst casing 4, but when the air fuel ratio of the exhaust gas flowing into the first catalyst casing 4 is made excessively low, the amount of hydrogen production is easy to change to a large extent with a small change of the air fuel ratio.

Accordingly, in this embodiment, the air fuel ratio of the exhaust gas flowing into the first catalyst casing 4 at the time of the execution of the inducement processing is set to a fixed value (e.g., about 12) in a range in which the amount of hydrogen produced by the NSR catalyst becomes sufficiently large and in which a change in the amount of hydrogen production with respect to a change in the air fuel ratio becomes small, in consideration of the rate of fuel consumption of the internal combustion engine 1, etc. The air fuel ratio set in this manner (hereinafter, referred to as an "air fuel ratio for diagnosis") corresponds to a "predetermined rich air fuel ratio" according to the present invention. Here, note that the air fuel ratio of the exhaust gas flowing into the first catalyst casing 4 is the same as that of the exhaust gas being discharged from the internal combustion engine 1, and hence, by setting the target air fuel ratio of the mixture to be combusted in the internal combustion engine 1 to the above-mentioned air fuel ratio for diagnosis at the time of the execution of the inducement processing, it is possible to adjust the air fuel ratio of the exhaust gas flowing into the first catalyst casing 4 to the above-mentioned air fuel ratio for diagnosis.

However, even if the amount of hydrogen produced by the NSR catalyst of the first catalyst casing 4 is stabilized by controlling the air fuel ratio of the mixture to be combusted in the internal combustion engine 1 to the above-mentioned air fuel ratio for diagnosis during the execution of the inducement processing, the air fuel ratio of the exhaust gas flowing into the second catalyst casing 5 may vary, according to the state of the NSR catalyst, etc. In particular, at the beginning of the start of the inducement processing, the air fuel ratio of the exhaust gas flowing into the second catalyst casing 5 may become higher than the air fuel ratio for diagnosis, due to the influence of oxygen, $NO_X$ and so on desorbing from the NSR catalyst of the first catalyst casing 4, but at that time, the amount of oxygen and the amount of $NO_X$ desorbing from the NSR catalyst vary according to the state of the NSR catalyst, so that the air fuel ratio of the exhaust gas flowing into the second catalyst casing 5 will also vary accordingly.

As mentioned above, when the air fuel ratio of the exhaust gas flowing into the second catalyst casing 5 varies, a total amount of hydrogen oxidized in the SCR catalyst during the execution of the inducement processing (a "total amount of oxidation") may also vary. Here, in FIG. 4, there is shown the correlation among the air fuel ratio of exhaust gas flowing into the second catalyst casing 5, an amount of a reducing agent, and an amount of hydrogen oxidized in the SCR catalyst per unit time (an amount of hydrogen oxidation), at the time of the execution of the inducement processing. The "reducing agent" referred to herein contains the hydrogen produced in the NSR catalyst of the first catalyst casing 4, in addition to unburnt fuel components such as hydrocarbon, carbon monoxide, etc., contained in the exhaust gas flowing into the second catalyst casing 5. Such an amount of the reducing agent is obtained, for example, by dividing a flow rate of the exhaust gas (a total amount of the amount of intake air and the amount of fuel injection) by a difference between the measured value of the first air fuel ratio sensor 7 including the rich shift thereof due to the hydrogen produced in the NSR catalyst and the stoichiometric air fuel ratio. Here, note that FIG. 4 shows the correlation when the SCR catalyst is in the normal state where it has not deteriorated.

Figure 4:
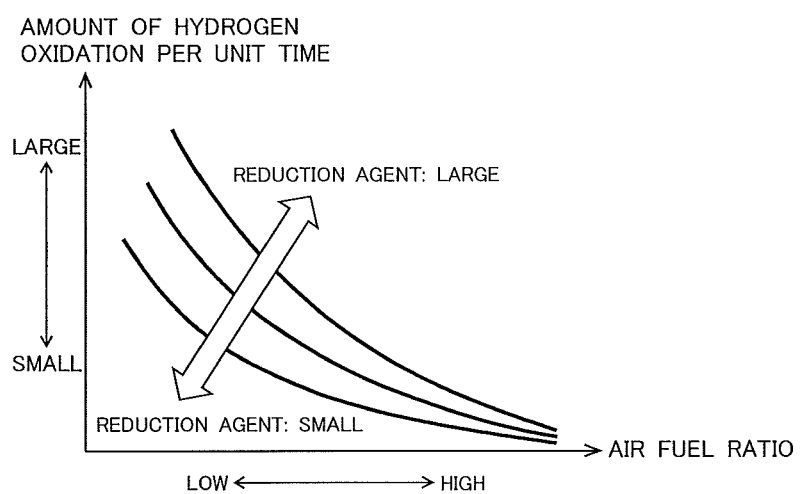
FIG. 4 is a view showing the correlation among an air fuel ratio of exhaust gas flowing into a second catalyst casing, an amount of a reducing agent, and an amount of hydrogen oxidation per unit time, at the time of the execution of inducement processing.

In FIG. 4, when the amount of the reducing agent contained in the exhaust gas flowing into the second catalyst casing 5 is constant, the amount of hydrogen oxidation per unit time tends to become larger when the air fuel ratio of the exhaust gas flowing into the second catalyst casing 5 is low than when it is high. As a result, when the air fuel ratio of the exhaust gas flowing into the second catalyst casing 5 varies at the time of the execution of the inducement processing, the total amount of oxidation accordingly varies, so that the total sensor output difference will also vary. Thus, when a variation in the total sensor output difference resulting from a variation in the air fuel ratio of the exhaust gas flowing into the second catalyst casing 5 occurs, it may become unable to diagnose the deterioration state of the SCR catalyst in an accurate manner.

Figure 5:
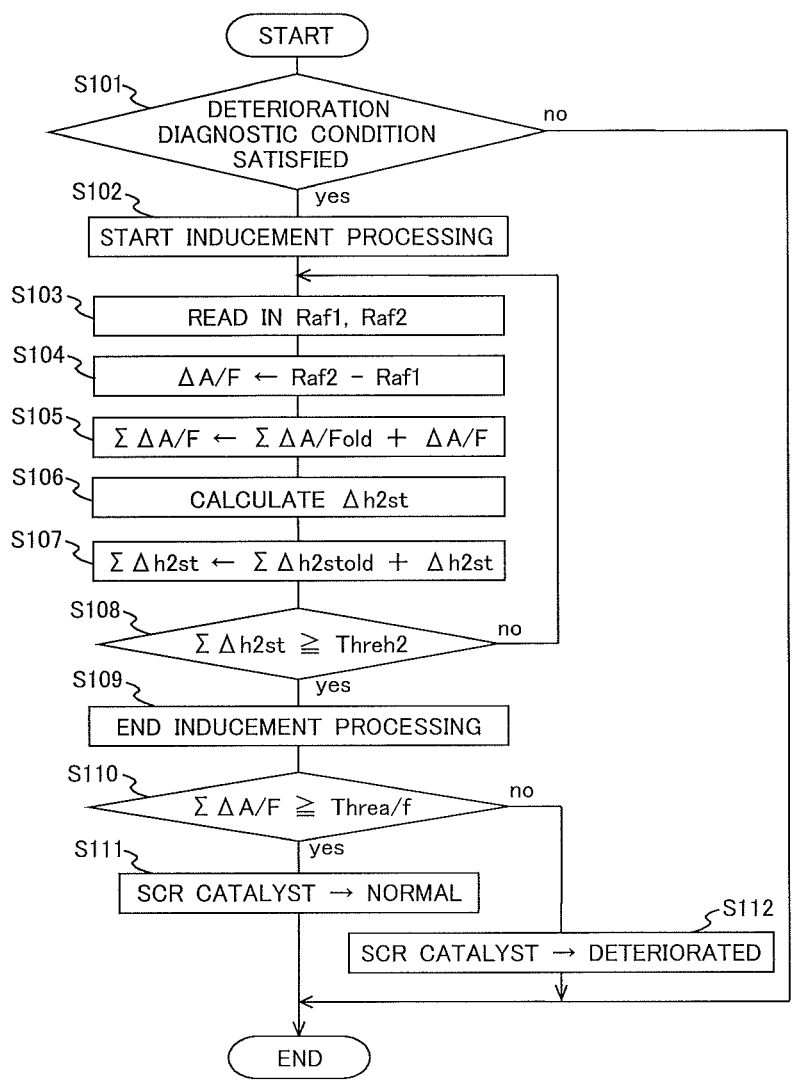
FIG. 5 is a flow chart showing a processing routine which is executed at the time of making a deterioration diagnosis of the SCR catalyst.

Accordingly, in this embodiment, the deterioration of the SCR catalyst is diagnosed by adjusting the end time of the inducement processing in such a manner that the total amount of oxidation in the period of the execution of the inducement processing becomes constant. In the following, a procedure of diagnosing the deterioration of the SCR catalyst in this embodiment will be explained along FIG. 5. FIG. 5 is a flow chart showing a processing routine which is executed by the ECU 6 at the time of making a deterioration diagnosis of the SCR catalyst. The processing routine in FIG. 5 has been beforehand stored in the ROM of the ECU 6, and is carried out in a repeated manner by the ECU 6 when the operating state of the internal combustion engine 1 is in the lean operating region.

In the processing routine of FIG. 5, first in the processing of step S101, the ECU 6 determines whether a diagnostic condition is satisfied. The diagnostic condition referred to herein is as follows: the operating state of the internal combustion engine 1 is in the lean operating region; the NSR catalyst of the first catalyst casing 4 and the SCR catalyst of the second catalyst casing 5 are activated; the first air fuel ratio sensor 7 and the second air fuel ratio sensor 8 are normal, etc. Here, note that when the inducement processing is carried out in a state where the amount of intake air is relatively small, the period of the execution of the inducement processing may be prolonged. On the other hand, when the inducement processing is carried out in a state where the amount of intake air is relatively large, the amount of hydrogen passing through the SCR catalyst may become large. Accordingly, a range of the amount of intake air may have been obtained in advance in which the length of the execution period of time of the inducement processing and the amount of hydrogen passing through the SCR catalyst become optimal balance, and a condition that an actual amount of intake air (a measured value of the air flow meter 12) falls in the range may be added to the above-mentioned diagnostic condition. In addition, the temperature of the SCR catalyst may change in the period of execution of the inducement processing, and when a change in the amount of hydrogen oxidation with respect to a change in the temperature of the SCR catalyst becomes large, a change in the total sensor output difference resulting from the temperature change may become large. Accordingly, a temperature range has been obtained in advance in which the change in the amount of hydrogen oxidation with respect to the temperature change of the SCR catalyst becomes relatively small, and a condition that the temperature of the SCR catalyst belongs to the temperature range may also be added to the above-mentioned diagnostic condition.

In cases where a negative determination is made in the processing of step S101, the ECU 6 ends the execution of this processing routine. On the other hand, in cases where an affirmative determination is made in the above-mentioned processing of step S101, the routine of the ECU 6 goes to the processing of step S102, where the inducement processing is started. Specifically, the ECU 6 decreases the air fuel ratio of the exhaust gas flowing into the first catalyst casing 4 to the above-mentioned air fuel ratio for diagnosis by setting the target air fuel ratio of the mixture to be supplied for combustion in the internal combustion engine 1 to the air fuel ratio for diagnosis.

After carrying out the above-mentioned processing of step S102, the routine of the ECU 6 goes to the processing of step S103, where the ECU 6 reads in a measured value Raf1 of the first air fuel ratio sensor 7 and a measured value Raf2 of the second air fuel ratio sensor 8. Subsequently, the routine of the ECU 6 goes to the processing of step S104, where a sensor output difference $\Delta A/F$ is calculated by subtracting the measured value Raf1 of the first air fuel ratio sensor 7 from the measured value Raf2 of the second air fuel ratio sensor 8 read in the above-mentioned step S103. Then, in the processing of step S105, the ECU 6 calculates an integrated value (total sensor output difference) $\Sigma \Delta A/F$ of the sensor output difference $\Delta A/F$ in a period of time from the start of the inducement processing to the current point in time. Specifically, the ECU 6 calculates the total sensor output difference $\Sigma \Delta A/F$ in the period of time from the start of the inducement processing to the current point in time, by adding the difference $\Delta A/F$ thus calculated in the above-mentioned processing of step S104 to an integrated value $\Sigma \Delta A/Fold$ of the sensor output difference $\Delta A/F$ in a period of time from the start of the inducement processing to the time of the last execution of step S105.

In addition, in the processing of step S106, by using as a parameter the measured value Raf1 of the first air fuel ratio sensor 7 read in the above-mentioned processing of step S103, the ECU 6 estimates an amount of hydrogen (i.e., a reference amount of oxidation) $\Delta h2st$ which is oxidized in the SCR catalyst per unit time, in the case of assuming that the SCR catalyst is in an undeteriorated state (i.e., a predetermined state). Specifically, the ECU 6 first obtains the flow rate of the exhaust gas by adding the measured value (amount of intake air) of the air flow meter 12 and the amount of fuel injection to each other, and then calculates the amount of the reducing agent contained in the exhaust gas flowing into the second catalyst casing 5 by dividing the flow rate of the exhaust gas by a difference between the measured value Raf1 of the first air fuel ratio sensor 7 and the stoichiometric air fuel ratio. Thereafter, by using as arguments the amount of the reducing agent thus calculated and the measured value Raf1 of the first air fuel ratio sensor 7 read in the above-mentioned processing of step S103, the ECU 6 calculates the reference amount of oxidation $\Delta$ h2st by accessing a map in which the above-mentioned correlation as shown in FIG. 4 has been stored. Here, note that the "reducing agent" referred to herein contains unburnt fuel components such as hydrocarbon, carbon monoxide, etc., and the hydrogen produced in the NSR catalyst of the first catalyst casing 4, as described in the above-mentioned explanation of FIG. 4.

After carrying out the above-mentioned processing of step S106, the routine of the ECU 6 goes to the processing of step S107, where the ECU 6 calculates an integrated value (i.e., a total reference amount of oxidation) $\Sigma \Delta$ h2st of the reference amount of oxidation $\Delta$ h2st in the period of time from the start of the inducement processing to the current point in time. Specifically, the ECU 6 calculates the total reference amount of oxidation $\Sigma \Delta$ h2st in the period of time from the start of the inducement processing to the current point in time, by adding the reference amount of oxidation $\Delta$ h2st thus calculated in the above-mentioned processing of step S106 to an integrated value $\Sigma \Delta$ h2stold of the reference amount of oxidation $\Delta$ h2st in a period of time from the start of the inducement processing to the time of the last execution of step S107.

In the processing of step S108, the ECU 6 determines whether the total reference amount of oxidation $\Sigma \Delta$ h2st calculated in the above-mentioned processing of step S107 is equal to or more than a target amount Threh2. The "target amount Threh2" referred to herein is an amount at which it is considered that a remarkable difference in the total sensor output difference $\Sigma \Delta$ A/F occurs between the case where the SCR catalyst has not deteriorated and the case where it has deteriorated, and is an amount which has been obtained in advance by means of adaptation processing making use of experiments, etc.

In cases where a negative determination is made in the above-mentioned processing of step S108 ($\Sigma \Delta$ h2st<Threh2), a return is made to the processing of step S103, where the inducement processing is continuously carried out. On the other hand, in cases where an affirmative determination is made in the above-mentioned processing of step S108 ($\Sigma \Delta$ h2st≥Threh2), the routine of the ECU 6 goes to the processing of step S109, where the inducement processing is ended. In other words, the ECU 6 returns the air fuel ratio of the exhaust gas flowing into the catalyst casing 5 from the rich air fuel ratio to a lean air fuel ratio which is suitable for the operating condition of the internal combustion engine 1. Thus, when the end time of the inducement processing is adjusted based on the total reference amount of oxidation $\Sigma \Delta$ h2st, an actual total amount of oxidation in the period of the execution of the inducement processing may become smaller than the above-mentioned total reference amount of oxidation according to the deterioration state of the SCR catalyst, but the total amount of oxidation is suppressed from varying for each execution of the inducement processing.

When the inducement processing is ended in the above-mentioned processing of step S109, the routine of the ECU 6 goes to the processing of step S110, where the ECU 6 determines whether the total sensor output difference $\Sigma \Delta$ A/F calculated in the above-mentioned processing of step S107 is equal to or larger than a predetermined threshold value Threa/f. The "predetermined threshold value Threa/f" referred to herein is a value at which it can be considered that when the total sensor output difference $\Sigma \Delta$ A/F is less than the predetermined threshold value Threa/f, the $NO_X$ reduction performance of the SCR catalyst has deteriorated, and which has been obtained in advance by adaptation processing making the use of experiments, etc.

In cases where an affirmative determination is made in the above-mentioned processing of step S110 ($\Sigma \Delta$ A/F≥Threa/f), the routine of the ECU 6 goes to the processing of step S111, where the ECU 6 makes a determination that the SCR catalyst of the second catalyst casing 5 has not deteriorated (normal). On the other hand, in cases where a negative determination is made in the above-mentioned processing of step S110 ($\Sigma \Delta$ A/F<Threa/f), the routine of the ECU 6 goes to the processing of step S112, where a determination is made that the SCR catalyst of the second catalyst casing 5 has deteriorated. In that case, the ECU 6 may prompt to repair the second catalyst casing 5 by making use of an alarm lamp, a display unit, or the like, which is arranged in a passenger compartment of the vehicle.

When the deterioration diagnosis is carried out according to the procedure described above, even if a variation in the air fuel ratio of the exhaust gas flowing into the second catalyst casing 5 occurs at the time of the execution of the inducement processing, the total amount of oxidation of the hydrogen oxidized in the SCR catalyst in the period of the execution of the inducement processing can be made substantially constant, unless the deterioration state of the SCR catalyst changes to a large extent. As a result, the variation in the total sensor output difference $\Sigma \Delta$ A/F resulting from the variation in the air fuel ratio of the exhaust gas flowing into the second catalyst casing 5 is alleviated or reduced, so that the deterioration state of the SCR catalyst comes to be reflected in the total sensor output difference $\Sigma \Delta$ A/F in an accurate manner. As a result, it becomes possible to diagnose the deterioration state of the SCR catalyst in an accurate manner, based on the total sensor output difference $\Sigma \Delta$ A/F.

Here, note that in a processing routine of FIG. 5, the deterioration diagnosis of the SCR catalyst received in the catalyst casing 5 is carried out based on the integrated value of the difference (the total sensor output difference) between the measured value of the first air fuel ratio sensor 7 and the measured value of the second air fuel ratio sensor 8 in the state where the inducement processing has been carried out, but the deterioration diagnosis of the SCR catalyst in the catalyst casing 5 may be made based on an integrated value of a value (Aox) which is obtained by substituting the difference between the measured value of the first air fuel ratio sensor 7 and the measured value of the second air fuel ratio sensor 8 into the above-mentioned expression (1).

Other Embodiments

Figure 6:
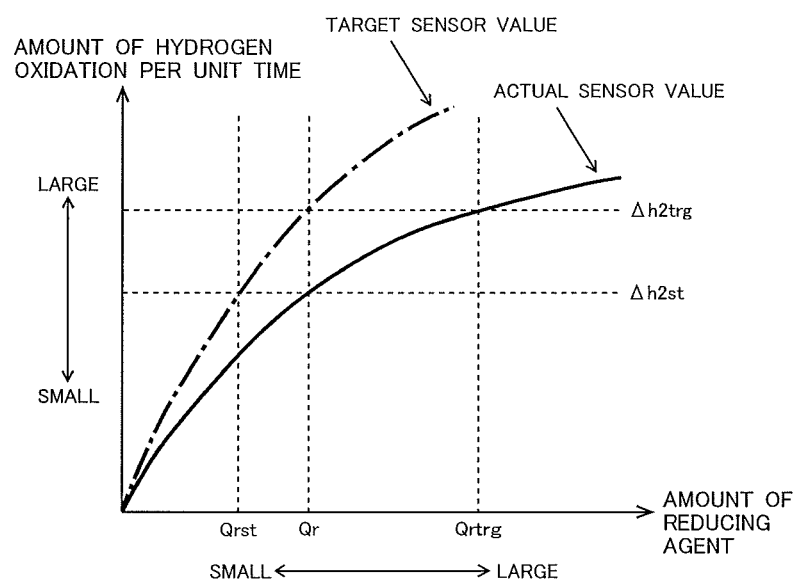
FIG. 6 is a view showing another method of adjusting an end time of inducement processing.

In the above-mentioned embodiment, reference has been made to an example in which the end time of the inducement processing is adjusted based on the total reference amount of oxidation $\Sigma$ h2st, but the end time of the inducement processing may be adjusted based on an amount of reducing agent supplied to the second catalyst casing 5 during the execution of the inducement processing. A procedure in that case will be explained below based on FIG. 6. Here, note that an amount of hydrogen oxidation per unit time in FIG. 6 is a value when the SCR catalyst is in a normal state where it has not deteriorated.

First, in the case of assuming that the measured value of the first air fuel ratio sensor 7 is a target value (i.e., a "target sensor value" in FIG. 6), the ECU 6 obtains a reference amount of oxidation Δ h2trg which can be achieved with an amount of reducing agent (an actual amount of reducing agent) Qr actually contained in the exhaust gas flowing into the second catalyst casing 5, and sets the reference amount of oxidation Δ h2trg thus obtained as a target amount of oxidation. The "target sensor value" referred to herein is a value which is obtained by adding an amount of rich shift of the second air fuel ratio sensor 8 resulting from hydrogen to the above-mentioned air fuel ratio for diagnosis, wherein the amount of rich shift in that case should have been experimentally obtained in advance. Subsequently, the ECU 6 obtains an amount of reducing agent (a required amount of reducing agent) Qrtrg which is required for oxidizing hydrogen in the above-mentioned target amount of oxidation Δ h2trg in the SCR catalyst under an air fuel ratio actually measured by the second air fuel ratio sensor 8 (an "actual sensor value" in FIG. 6). Moreover, the ECU 6 multiplies the above-mentioned actual amount of reducing agent Qrst by the ratio (=Qrst/Qrtrg) of the actual amount of reducing agent Qrst with respect to the required amount of reducing agent Qrtrg. The value (=Qrst*(Qrst/Qrtrg)) thus obtained corresponds to an amount of reducing agent (hereinafter, referred to as a "reference amount of reducing agent") Qrst which is required in order to achieve, under the above-mentioned target sensor value, an amount of oxidation equal to the reference amount of oxidation Δ h2st in the case where the reducing agent in the actual amount of reducing agent Qr is supplied to the second catalyst casing 5 under the actual sensor value. Then, the ECU 6 integrates the reference amount of reducing agent Qrst for each unit time, and terminates or ends the inducement processing at the time when the integrated value reaches a predetermined amount of reducing agent (i.e., an amount of reducing agent which is required in order to make the total reference amount of oxidation in the case of assuming that the measured value of the second air fuel ratio sensor 8 is the above-mentioned target sensor value equal to the above-mentioned target amount Threh2). When the end time of the inducement processing is adjusted in such a manner, it is possible to suppress the variation in the total sensor output difference resulting from the variation in the air fuel ratio of the exhaust gas flowing into the second catalyst casing 5, similar to the above-mentioned embodiment.

In addition, in the above-mentioned embodiment, there has been described an example in which the NSR catalyst is received in the first catalyst casing 4, but even in cases where a three-way catalyst is received in the first catalyst casing 4, the deterioration diagnosis of the SCR catalyst can be carried out by the same procedure. In other words, with such an arrangement that a catalyst for promoting a water-gas-shift-reaction at the time of the air fuel ratio of exhaust gas becoming a rich air fuel ratio is disposed in the exhaust pipe 3 at the upstream side of the first air fuel ratio sensor 7, the deterioration diagnosis of the SCR catalyst can be carried out according to the procedure described in this embodiment.

Moreover, in an arrangement in which a catalyst casing with a three-way catalyst received therein is disposed at the further upstream side of the first catalyst casing 4, too, the deterioration diagnosis of the SCR catalyst can be carried out according to the same procedure. In the arrangement that the catalyst casing with the three-way catalyst received therein is disposed at the upstream side of the first catalyst casing 4, hydrogen is produced by the three-way catalyst of the catalyst casing disposed at the upstream of the first catalyst casing 4, too, in addition to the NSR catalyst of the first catalyst casing 4, at the time of the execution of the inducement processing, as a consequence of which a difference in the integrated value Σ Δ A/F between the case where the SCR catalyst of the second catalyst casing 5 has deteriorated and the case where the SCR catalyst of the second catalyst casing 5 has not deteriorated is enlarged further. As a result, deterioration diagnosis with higher precision can be carried out.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-265383, filed on Dec. 26, 2014, which is hereby incorporated by reference herein in its entirety.

What is claimed is:

1. A deterioration diagnosis device for an exhaust gas purification apparatus comprising:
   a first exhaust gas purification device that is arranged in an exhaust passage of an internal combustion engine which can be operated in a lean burn state, and is equipped with a catalyst which serves to promote a water-gas-shift-reaction when an air fuel ratio of exhaust gas is a rich air fuel ratio which is lower than a stoichiometric air fuel ratio;
   a second exhaust gas purification device that is arranged in the exhaust passage at the downstream side of the first exhaust gas purification device, and is equipped with a selective catalytic reduction catalyst which serves to store oxygen in the exhaust gas when the air fuel ratio of the exhaust gas is a lean air fuel ratio higher than the stoichiometric air fuel ratio, but to desorb the oxygen thus stored when the fuel ratio of the exhaust gas is equal to or lower than the stoichiometric air fuel ratio;
   a first air fuel ratio sensor that measures a physical quantity correlated with an air fuel ratio of exhaust gas flowing into the second exhaust gas purification device;
   a second air fuel ratio sensor that measures a physical quantity correlated with an air fuel ratio of exhaust gas flowing out from the second exhaust gas purification device; and
   a controller comprising at least one processor configured to:
   start inducement processing, which is to induce a water-gas-shift-reaction in the first exhaust gas purification device by changing an air fuel ratio of exhaust gas flowing into the first exhaust gas purification device to a predetermined rich air fuel ratio lower than the stoichiometric air fuel ratio, when an air fuel ratio of exhaust gas discharged from an internal combustion engine is a lean air fuel ratio, estimate, after the start of the inducement processing, an amount of hydrogen oxidized per unit time in a predetermined state of the selective catalytic reduction catalyst based on a measured value of the first air fuel ratio sensor, integrate an estimated value thus obtained for each unit time, and end the inducement processing when an integrated value thus obtained becomes equal to or more than a predetermined target amount; and obtain a total sensor output difference, which is a total sum of a sensor output difference in a period of time from the start to the end of the inducement processing, by integrating the sensor output difference which is a difference between the measured value of the first air fuel ratio sensor and a measured value of the second air fuel ratio sensor in the period of time, and diagnose deterioration of the second exhaust gas purification device by using the total sensor output difference as a parameter.

2. The deterioration diagnosis device for an exhaust gas purification apparatus according to claim 1, wherein
the selective catalytic reduction catalyst has a characteristic in which an amount of hydrogen oxidized per unit time becomes smaller in the case where the air fuel ratio of the exhaust gas flowing into the selective catalytic reduction catalyst is high, in comparison with the case where it is low; and the controller estimates the amount of hydrogen oxidized per unit time in a predetermined state of the selective catalytic reduction catalyst to be smaller in the case where the measured value of the first air fuel ratio sensor is high, in comparison with the case where it is low.

3. The deterioration diagnosis device for an exhaust gas purification apparatus according to claim 1, wherein
the predetermined state of the selective catalytic reduction catalyst is a state where the selective catalytic reduction catalyst has not deteriorated.

4. The deterioration diagnosis device for an exhaust gas purification apparatus according to claim 2, wherein
the predetermined state of the selective catalytic reduction catalyst is a state where the selective catalytic reduction catalyst has not deteriorated.

* * * * *